(12) United States Patent
Kilmartin et al.

(10) Patent No.: US 11,187,126 B2
(45) Date of Patent: Nov. 30, 2021

(54) EXHAUST GAS TREATMENT SYSTEM AND THE USE THEREOF FOR THE TREATMENT OF AN EXHAUST GAS

(71) Applicant: JOHNSON MATTHEY PUBLIC LIMITED COMPANY, London (GB)

(72) Inventors: John Kilmartin, Reading (GB); Andrea Eva Pascui, Reading (GB); Kerry Simmance, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/832,085

(22) Filed: Mar. 27, 2020

(65) Prior Publication Data

US 2020/0309007 A1 Oct. 1, 2020

(30) Foreign Application Priority Data

Mar. 28, 2019 (GB) ..................... 1904299

(51) Int. Cl.
*F01N 3/20* (2006.01)
*F01N 3/28* (2006.01)
(Continued)

(52) U.S. Cl.
CPC ......... *F01N 3/2013* (2013.01); *F01N 3/2006* (2013.01); *F01N 3/2825* (2013.01);
(Continued)

(58) Field of Classification Search
CPC ...... F01N 3/2013; F01N 13/16; F01N 3/2006; F01N 3/2825; F01N 2330/06; F01N 2240/16; F01N 2240/05; F01N 3/027; F01N 2510/06; F01N 3/0222; F01N 3/2066; F02D 41/024; Y02T 10/12; B01J 21/063; B01J 21/04; B01J 27/224; B01J 23/75; B01J 35/04; B01J 23/889; B01J 23/005; B01J 23/00; B01J 35/0033; B01J 35/023; B01J 23/745; B01D 53/9418; B01D 2255/9202; B01D 2255/2073; B01D 2257/404; B01D 2255/20746; B01D 2255/405; B01D 2255/20761; B01D 2255/20738; B01D 53/94; B01D 53/9436; B01D 53/944; B01D 53/945
See application file for complete search history.

(56) References Cited

U.S. PATENT DOCUMENTS

2015/0075137 A1 3/2015 Crawford et al.
2015/0105245 A1 4/2015 Nazarpoor et al.
(Continued)

FOREIGN PATENT DOCUMENTS

CN 107617440 A 1/2018
EP 3495635 A1 6/2019
(Continued)

*Primary Examiner* — Brandon D Lee

(57) ABSTRACT

An exhaust gas treatment system (1) comprises a catalyst article (5) for the treatment of an exhaust gas, the catalyst article (5) comprising a non-metallic substrate (20) comprising a plurality of catalytically-active transition-metal-doped iron oxide magnetic particles (45), and an inductive heater (70) for inductively heating the plurality of catalytically-active magnetic particles by applying an alternating magnetic field.

16 Claims, 7 Drawing Sheets

(51) Int. Cl.
    *F01N 13/16*         (2010.01)
    *F02D 41/02*         (2006.01)

(52) U.S. Cl.
    CPC .......... *F01N 13/16* (2013.01); *F01N 2330/06* (2013.01); *F02D 41/024* (2013.01)

(56) References Cited

U.S. PATENT DOCUMENTS

| | | |
|---|---|---|
| 2015/0148215 A1 | 5/2015 | Nazarpoor |
| 2016/0263526 A1 | 9/2016 | Golden |
| 2019/0070596 A1* | 3/2019 | Yang ..................... F01N 3/2013 |
| 2019/0076773 A1* | 3/2019 | Beall .................. B01D 46/2429 |
| 2020/0070139 A1* | 3/2020 | Irvine ..................... B01J 23/866 |

FOREIGN PATENT DOCUMENTS

| | | | |
|---|---|---|---|
| JP | 05168950 A | 7/1993 |
| WO | 9947260 A1 | 9/1999 |
| WO | 2016021186 A1 | 2/2016 |
| WO | 2017195107 A2 | 11/2017 |

\* cited by examiner

EXHAUST GAS TREATMENT SYSTEM AND THE USE THEREOF FOR THE TREATMENT OF AN EXHAUST GAS

This disclosure relates to an exhaust gas treatment system for the treatment of an exhaust gas. In particular the disclosure relates to a catalyst that is inductively heatable to allow improved treatment of gases from an internal combustion engine during cold-start.

Conventional catalyst systems typically require several minutes to reach operating temperature, for example, during a cold-start of an engine. Before the operating temperature is reached, undesirable gaseous pollutant breakthrough may occur.

In order to reduce the undesirable gaseous pollutant breakthrough normally associated with operation of the catalyst at low temperature, it is known to indirectly heat the catalytically active material. WO2017/195107 discloses a catalyst composition for treating engine effluent. The catalyst composition comprises a mixture of catalytically active particles and a magnetic material capable of inductive heating in response to an applied alternating electromagnetic field. The catalytically active particles are indirectly heated by conduction of heat from the inductively heated magnetic material. WO2017/195107 also discloses a system adapted for heating a catalyst material. The system comprises a catalyst article having a catalyst layer adhered to each channel of the article. The catalyst layer comprises a catalytically active material with a magnetic material dispersed therein. The magnetic material is capable of inductive heating in response to an applied alternating electromagnetic material. The system further comprises a conductor for receiving current and generating an alternating electromagnetic field. The conductor is positioned such that the electromagnetic field is applied to at least a portion of the magnetic material. WO2017/195107 also discloses a method of treating emissions from an internal combustion engine.

WO2017/195107 discloses that the catalytically active particles can be formed of catalytically active materials commonly employed in emission control systems for gasoline or diesel engines. The catalytically active particles may be part of a composition adapted for one or more of oxidation of carbon monoxide, oxidation of hydrocarbons, oxidation of NOx, oxidation of ammonia, selective catalytic reduction of NOx and NOx storage/reduction. WO2017/195107 discloses that the magnetic material is in a particulate form that is readily dispersible with a catalyst composition. WO2017/195107 discloses that the magnetic material comprises superparamagnetic iron oxide nanoparticles or rare-earth-containing particulate material comprising neodymium-iron-boron or samarium-cobalt particles.

WO2017/195107 discloses that the magnetic material may comprise superparamagnetic iron (III) oxide nanoparticles.

WO2017/195107 discloses that the magnetic material is admixed with the catalyst material prior to coating a substrate. For example, the magnetic material could be added to a washcoat slurry and dispersed within the catalyst material before coating. Instead, the magnetic material could serve as a support material for a catalytically active material. Alternatively, the magnetic material could be embedded in the substrate of the catalyst article or coated as a layer serving as a support for the catalytically active components.

In WO2017/195107 the heating of the catalytically active particles relies upon conduction of heat from the inductively heated magnetic material to the catalytically active material. Consequently, not all of the heat generated by induction will be transmitted to the catalytically active material, thereby reducing the efficiency of heating the catalytically active particles.

It is also known that some spinel structure compounds can be catalytically active. US2015/0105245 discloses a Zero Platinum Group Metals and Zero Rare Earth (ZPGM-ZRE) catalyst system for a three-way catalyst (TWC) system. The ZPGM catalyst is free of platinum group metal (PGM) and rare earth metal (RE) and comprises a substrate, a washcoat and an overcoat. The washcoat comprises $Al_2O_3$. The overcoat is substantially free of PGMs and rare earth metals. The overcoat comprises at least one oxygen storage material, which comprises a Cu—Mn spinel having a niobium-zirconia support oxide.

US2015/0148215 discloses a method for optimising a catalyst component. The method comprises applying a first washcoat and a second washcoat/overcoat. The first washcoat comprises $Al_2O_3$ and the second washcoat/overcoat has at least one active phase catalyst comprising Cu—Mn and a support oxide comprising $Nb_2O_5$—$ZrO_2$.

US2016/0263526 discloses catalyst materials for TWC applications, and more particularly, to a synergized platinum group metal (PGM) TWC catalyst configuration. US2016/0263526 discloses a catalytic system comprising a first catalytic apparatus comprising at least two catalytic portions and a second catalytic apparatus comprising at least one catalytic portion. One of the at least two catalytic portions of the first catalytic apparatus comprises at least one binary spinel composition. The other catalytic portion of the first catalytic apparatus comprises a close-coupled catalyst. At least one catalytic portion of the second catalytic apparatus comprises a platinum group metal.

It is an object to provide an improved exhaust gas treatment system for a cold-start engine, tackling the disadvantages of the prior art, or at least to provide a commercially useful alternative thereto. More specifically, it is an object to provide an exhaust gas treatment system that more efficiently reduces the undesirable gaseous pollutant breakthrough normally associated with cold-start of an engine.

Accordingly in a first embodiment there is provided an exhaust gas treatment system comprising a catalyst article for the treatment of an exhaust gas, the catalyst article comprising a non-metallic substrate comprising a plurality of catalytically-active transition-metal-doped iron oxide magnetic particles, and an inductive heater for heating the plurality of catalytically-active magnetic particles by applying an alternating magnetic field.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present invention relates to an exhaust gas treatment system. The exhaust may be from a diesel or gasoline engine. Typically it is a mobile engine rather than a stationary engine, since they are most affected by cold start issues.

The exhaust gas treatment system comprises a catalyst article for the treatment of an exhaust gas. A catalyst article as used herein refers to a component of an exhaust gas system that has catalytic activity for treatment of exhaust gas. Such catalytic articles provide a supported catalyst for the treatment of gases brought into contact with the catalyst.

The catalyst article described herein comprises the multiple sub-components described herein.

The catalyst article comprises a non-metallic substrate. A non-metallic substrate as used herein refers to a component that does not have the properties of a metal, in particular, the non-metallic substrate is not a good conductor of heat. Preferably the non-metallic substrate is a ceramic substrate, preferably comprising SiC, aluminium titanate or Cordierite.

Preferably, the non-metallic substrate is a flow-through honeycomb monolith or wall-flow filter. Flow-through monoliths are well known in the art and typically comprise a plurality of channels through which the exhaust gas flows in use. The channels are provided with the catalyst material for treating the off-gas. The channels typically have porous walls for increasing the surface area of catalyst with which the exhaust gas can be treated. The non-metallic substrate, particularly the wall-flow filter, may have a porosity of 40 to 75%, such as 45 to 70% (e.g. 45 to 65%) or 50 to 60%.

The non-metallic substrate comprises a plurality of catalytically-active transition-metal-doped iron oxide magnetic particles. These may be an integral part of the substrate, such as a coextruded ingredient, or provided as a washcoat. Preferably the plurality of catalytically-active magnetic particles are provided as a washcoat on the non-metallic substrate. When provided as a coextruded ingredient, the catalytically active transition-metal-doped iron oxide magnetic particles form a portion of the extruded body, meaning that the channel walls of the catalyst comprise the catalytically active material. When provided as a washcoat, a catalytically inert extruded, e.g. ceramic, substrate is coated with the plurality of catalytically-active transition-metal-doped iron oxide magnetic particles. This is effected, for example, by dipping the extruded support body into a suspension containing the catalytically-active transition-metal-doped iron oxide magnetic particles, or by using Johnson Matthey's precision coating process described in WO 99/47260. Washcoating techniques are well known in the art.

The plurality of catalytically-active transition-metal-doped iron oxide magnetic particles are present in a loading of 0.1 to 4, preferably in a loading of 1 to 3 g/in$^3$. This represents a suitable range for catalytic activity on a substrate for the treatment of exhaust gases.

The term "plurality of particles" as used herein refers to a large number of particles. The size of the particles is typically defined by the form the particles are used in (i.e. washcoat compatible).

Preferably the plurality of catalytically-active transition-metal-doped iron oxide magnetic particles have a mean particle size of from 1 nm to 10 µm, preferably 10 to 500 nm. Particle sizes can be measured with known techniques, including laser diffraction and TEM techniques.

The term "catalytically-active" as used herein means that the particles are able to treat (i.e. reduce the amount thereof) at least one undesirable component of exhaust gas under operating conditions. Such components include, for example, hydrocarbons, NOx, CO, particulate matter and ammonia.

The term "transition-metal-doped iron oxide particles" as used herein means particles formed of a composition comprising a crystal lattice containing atoms of iron, oxygen and one or more transition metals. The crystal lattice is that formed by iron oxide where the transition metal ions occupy some of the lattice positions of the iron ions. The term "transition metal" as used herein refers to an element having a partially filled d or f subshell in any common oxidation state, i.e. an element with a partially filled d sub-shell or one which can give rise to cations with an incomplete d sub-shell. Examples include: Sc, Ti, V, Cr, Mn, Fe, Co, Ni, Cu, Zn, Y, Zr, Nb, Mo, Tc, Ru, Rh, Pd, Ag and Cd. Manganese and Copper are preferred examples of transition metals. Each of the "transition-metal-doped iron oxide particles" may be formed of a composition comprising one transition metal or multiple different transition metals. The transition-metal-doped iron oxide particles may all have the same composition or comprise a mixture of two or more different such particles meeting the definitions herein.

Preferably the plurality of catalytically-active transition-metal-doped iron oxide magnetic particles have a spinel-type microstructure. Spinel-type microstructure means a face-centred cubic structure having composition $A_xB_{3-x}O_4$ where A represent a cation having charge state +2, B represents a cation having charge state +3 and O represents oxygen ions. As described herein, the plurality of particles are transition-metal doped iron oxide particles. Accordingly, A represents the transition metal ion(s) and B represents iron ions having charge state +3. The spinel-type microstructure can be a normal spinel microstructure where A represents a cation located on a tetrahedral site (surrounded by four oxygen ions) and B represents a cation located on octahedral sites (surrounded by six oxygen ions). Alternatively, the spinel-type microstructure may be an inverse spinel microstructure where half of the cations represented by B occupy the tetrahedral sites and remaining half of the cations represented by B and all of the cations represented by A occupy the octahedral sites. The B-site of the spinel can also be doped with a transition metal giving rise to the formula $A_xB_{3-x-y}B'_yO_4$ (y is <3 and >0, such as from 0.5 to 2.5).

Preferably the plurality of catalytically-active transition-metal-doped iron oxide magnetic particles comprise $Mn_xFe_{3-x}O_4$, $Co_xFe_{3-x}O_4$, $Cu_xFe_{3-x}O_4$ or a mixture of two or more thereof, wherein x>0 and x≤1. These compositions result in a normal spinel microstructure. In one embodiment x=1.

The term "magnetic" particles means particles that have a non-zero susceptibility to an external magnetic field at room temperature and during use conditions (i.e. at least during cold-start of an engine, preferably up to and including operating temperatures during operation of the engine).

Preferably the plurality of catalytically-active transition-metal-doped iron oxide magnetic particles are ferromagnetic or superparamagnetic. The plurality of catalytically-active magnetic particles may also be paramagnetic or diamagnetic. The magnetic properties of the plurality of catalytically-active magnetic particles are those at room temperature and during use conditions (i.e. during cold-start of an engine and during operation of the engine).

Ferromagnetic materials include any material that has a large, positive susceptibility to an external magnetic field. Ferromagnetic materials become magnetized when the electron spins become aligned to an external magnetic field. They typically exhibit a strong attraction to magnetic fields and are able to retain their magnetic properties after the external field has been removed. In the scope of this disclosure, materials that have a net magnetization shall be considered ferromagnetic even if some electron spins are anti-aligned and reduce the overall net magnetization (sometimes referred to as ferrimagnetic materials). Therefore, the term "ferromagnetic material" as used in the scope of the invention also includes a ferrimagnetic material. Above a critical temperature known as the Curie temperature, ferromagnets lose their ferromagnetic properties. That is, the Curie temperature is the temperature above which a ferromagnetic material loses all of its ferromagnetic properties. Accordingly, the composition of the plurality of catalytically-active transition-metal-doped iron oxide magnetic particles may be selected from ferromagnetic materials having a Curie temperature above the temperatures reached during operating of the exhaust gas treatment system. In the presence of an alternating magnetic field, the electron spins of ferromagnetic materials will flip as the magnetic field changes direction. When exposed to an alternating magnetic field with magnetic field reversal times shorter than the time to flip the electron spins, heat is generated by hysteresis loss. Consequently, ferromagnetic materials may be directly inductively heated by application of an alternating magnetic field.

Paramagnetic materials include materials that have a small, positive susceptibility to an external magnetic field, for example $10^{-5}$. Diamagnetic materials include materials that have a small, negative susceptibility to an external magnetic field, for example $-10^{-5}$. For paramagnetic materials, the electron spins will become partially aligned to an external magnetic field. For diamagnetic materials, the electron spins will become partially aligned in the opposite direction to an external magnetic field. In the presence of an alternating magnetic field, the electron spins of paramagnetic and diamagnetic materials will flip as the magnetic field changes direction. This results in generation of heat by hysteresis losses. Consequently, paramagnetic and diamagnetic materials may be directly inductively heated by application of the alternating magnetic field.

Superparamagnetic is a form of magnetism present in small ferromagnetic or ferromagnetic nanoparticles which are composed of a single magnetic domain. The term single magnetic domain does not require a uniform magnetization throughout the whole particle but instead refers to the absence of domain walls. Superparamagnetic materials have a much larger susceptibility to an external magnetic field than paramagnetic materials. Superparamagnetic particles also do not have a residual magnetisation and their magnetisation curves are not hysteretic. The electron spins of superparamagnetic materials can flip direction (relaxation of the magnetic moment) randomly over short periods of time and the time between two flips in direction is called the Néel relaxation time. The magnetization of the superparamagnetic materials averages to zero when no external magnetic field is applied. With an external magnetic field applied, the electron spins of superparamagnetic materials become aligned to the external magnetic field, leading to a net magnetization. In the presence of an alternating magnetic field, the electron spins of superparamagnetic materials will flip as the magnetic field changes direction. When exposed to an alternating field with magnetic field reversal times shorter than the magnetic relaxation times of the particles, then heat is generated by Néel relaxation. Consequently, superparamagnetic materials may be directly inductively heated by application of the alternating magnetic field.

The inventors have now discovered that it is possible to provide inductively heatable particles which are themselves catalytically active. Accordingly, the catalytically active particles may be directly heated by application of the alternating magnetic field. The heating of the catalytically active particles is thus not dependent upon conduction of heat from the source to the particles. Accordingly, the loss of heat during conduction is avoided and the efficiency of heating the catalytically active particles is maximised. Therefore, the time taken for the catalytically active particles to reach their operating temperature during cold-start is reduced. Accordingly, the conversion of exhaust gases may occur at cold-start i.e. before the whole catalyst article has warmed up to operating temperature. Consequently, the production of undesirable gaseous pollutant breakthrough normally associated with operation of a catalyst at low temperature is also reduced.

Preferably the plurality of catalytically-active transition-metal-doped iron oxide magnetic particles consist of transition-metal-doped iron oxide magnetic particles. By "consist", this means that the plurality of magnetic particles only include transition-metal-doped iron oxide magnetic particles and the particles are not surface-coated with other catalytic materials.

According to an alternative embodiment, preferably the plurality of catalytically-active transition-metal-doped iron oxide magnetic particles are surface-coated with a further catalytic material, preferably comprising one or more platinum group metals (PGM). The further catalytic material is able to treat components of the exhaust gas under operating conditions. Typically, the further catalytic material has the same catalytic activity as the activity of the plurality of catalytically-active transition-metal-doped iron oxide magnetic particles.

The system comprises an inductive heater for inductively heating the plurality of catalytically-active transition-metal-doped iron oxide magnetic particles by applying an alternating magnetic field. The inductive heater may be an induction heater coil. Preferably the alternating magnetic field has a frequency from 100 kHz to 1 Mhz, more preferably from 200 to 400 KHz. Suitable inductive heaters and frequencies can be readily determined based on electrical supply, target temperature and particles.

Preferably the magnetic particles are provided only on a region extending from one end of the catalyst article. This allows efficiency use of energy to heat a leading (or upstream) edge of a catalyst article.

Preferably the plurality of catalytically-active transition-metal-doped iron oxide magnetic particles have selective catalytic reduction (SCR) activity. This means that the plurality of catalytically-active transition-metal-doped iron oxide magnetic particles are capable of reducing $NO_x$ to $N_2$ by reactions with nitrogen compounds (such as ammonia or urea) or hydrocarbons (lean $NO_x$ reduction).

Preferably the plurality of catalytically-active transition-metal-doped iron oxide magnetic particles have ammonia slip catalyst (ASC) activity. This means that the plurality of catalytically-active transition-metal-doped iron oxide magnetic particles are able to convert $NH_3$ to $N_2$.

Preferably the plurality of catalytically-active transition-metal-doped iron oxide magnetic particles have diesel oxidation catalyst (DOC) activity. This means that the plurality of catalytically-active transition-metal-doped iron oxide magnetic particles are able to oxidize CO to $CO_2$ and gas phase hydrocarbons (HC) and an organic fraction of diesel particulates (soluble organic fraction) to $CO_2$ and $H_2O$. Details of iron-containing DOCs that may be adapted for use in the present invention include WO2018/042167A1, i.e. an oxidation catalyst for treating an exhaust gas produced by a diesel engine comprising a catalytic region and a substrate, wherein the catalytic region comprises a catalytic material comprising: iron (Fe) or an oxide thereof; a platinum group metal (PGM) selected from the group consisting of (i) platinum (Pt), (ii) palladium (Pd) and (iii) platinum (Pt) and palladium (Pd); and a support material, which is a refractory oxide comprising alumina; wherein the platinum group metal (PGM) and the iron (Fe) or an oxide thereof is each supported on the support material.

Preferably the plurality of catalytically-active transition-metal-doped iron oxide magnetic particles have Urea-hydrolysis activity. This means that the plurality of catalytically-active transition-metal-doped iron oxide magnetic particles are able to convert $CH_4N_2O$ to $NH_3$.

Preferably the plurality of catalytically-active transition-metal-doped iron oxide magnetic particles have Exotherm-generation activity. This means that the plurality of catalytically-active transition-metal-doped iron oxide magnetic particles are able to generate an exotherm (i.e. release heat) typically by combusting a hydrocarbon fuel.

Preferably the plurality of catalytically-active transition-metal-doped iron oxide magnetic particles have three-way catalyst (TWC) activity. This means that the plurality of catalytically-active transition-metal-doped iron oxide magnetic particles are able to convert $NO_x$ to $N_2$, carbon monoxide to $CO_2$, and hydrocarbons to $CO_2$ and $H_2O$ typically under conditions which average stoichiometric.

Preferably the article further comprises a further composition having the same type of catalytic activity as the plurality of catalytically-active transition-metal-doped iron oxide magnetic particles. For example, the article may comprise a plurality of catalytically-active transition-metal-doped iron oxide magnetic particles having SCR activity and a further composition having SCR activity. By way of further example, the article may comprise a plurality of catalytically-active transition-metal-doped iron oxide magnetic particles having ASC activity and a further composition having ASC activity. The plurality of plurality of catalytically-active transition-metal-doped iron oxide magnetic particles may be in a different region of the catalyst compared to the further composition. For example, the plurality of catalytically-active transition-metal-doped iron oxide magnetic particles may be provided on a region of the catalyst upstream of the region having the further composition thereon. In such an arrangement, an exhaust gas flowing from the engine would contact the plurality of catalytically-active transition-metal-doped iron oxide magnetic particles before contacting the further composition.

As will be appreciated, the article can alternatively, or in addition, comprise a further composition having a different type of catalytic activity, as discussed above, as the plurality of catalytically-active transition-metal-doped iron oxide magnetic particles.

Accordingly, during cold-start, the cold exhaust gas would be treated by the induction heated plurality of catalytically-active transition-metal-doped iron oxide magnetic particles. Over time, as the further composition reaches its operating temperature due to heat from the engine and conduction of heat from the inductively heated plurality of catalytically-active magnetic particles, the exhaust gas would also be treated by the further composition. The region having the plurality of catalytically-active transition-metal-doped iron oxide magnetic particles thereon may or may not overlap the region having the further composition. If the plurality of catalytically-active transition-metal-doped iron oxide magnetic particles are separate from the further composition, then the plurality of catalytically-active transition-metal-doped iron oxide magnetic particles tend to be positioned upstream of the further composition.

According to a further embodiment there is provided an internal combustion engine comprising the exhaust gas treatment system as described herein. Additionally, the present disclosure can comprise a vehicle, such as a passenger vehicle, comprising an engine as described herein.

According to a further embodiment there is provided a method for the treatment of an exhaust gas, the method comprising
contacting an exhaust gas with the exhaust gas treatment system as described herein and
inductively heating the plurality of catalytically-active magnetic particles with an alternating magnetic field produced by the inductive heater for inductively heating the plurality of catalytically-active magnetic particles.

According to a further embodiment there is provided the use of inductively heated catalytically-active transition-metal-doped iron oxide magnetic particles for the treatment of an exhaust gas, preferably an exhaust gas from a cold-start engine.

The invention will now be described in relation to the following non-limiting figures, in which.

Figure 1:
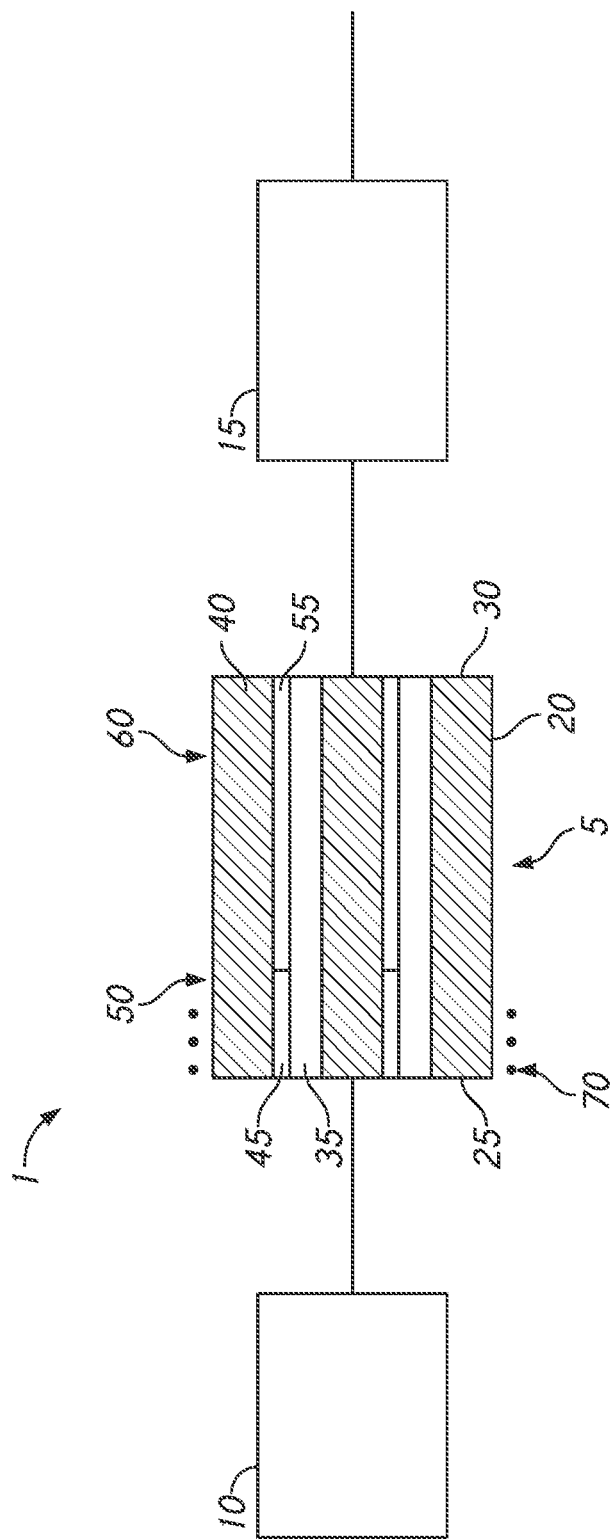
FIG. 1 shows an exhaust gas treatment system having a catalyst article, as described herein.

FIG. 1 shows an exhaust gas treatment system 1 comprising a catalyst article 5. An internal combustion engine 10 is in gaseous communication with the catalyst article 5. The catalyst article 1 is further in gaseous communication with the remainder 15 of the exhaust gas treatment system 1, which comprises at least an outlet to the environment, but can also comprise other catalyst articles. The catalyst article 5 is arranged downstream of the internal combustion engine 10 and upstream of the remainder 15 of the exhaust gas treatment system 1. By upstream it is meant that, in use, the catalyst article 5 is closer to the engine manifold vis-a-vis the flow of the exhaust gas leaving the engine. Similarly, the catalyst article 5 has a substrate 20, which has an end which is "upstream" since, in use, it is closer to the engine manifold. This means that the exhaust gas leaving the engine 10 first contacts the upstream end 25 of the substrate 20. The downstream end 30 of the substrate 20 is where the exhaust gas leaves the catalyst article 5 and progresses through the remainder 15 of the exhaust gas treatment system 1.

The substrate 20 of the catalyst article 5 is a monolithic honeycomb flow-through filter made of cordierite. The substrate 20 has a generally cylindrical shape with upstream end 25 and downstream end 30. The substrate 20 has a plurality of channels 35 formed therein by walls 40 extending from the upstream end 25 to the downstream end 30. The channels 35 are configured to enable gas flow therethrough from the upstream end 25 to the downstream end 30. The walls 40 each have a surface for contacting exhaust gas flowing therethrough.

A plurality of catalytically-active transition-metal-doped iron oxide magnetic particles 45, herein referred to as the plurality of particles 45, are applied as a washcoat on the walls 40 of a first region 50 of the catalyst article 5. The first region 50 of the catalyst article 5 extends from the upstream end 25 of the substrate 20. The plurality of catalytically-active transition-metal-doped iron oxide magnetic particles may have SCR activity, ASC activity, DOC activity, urea-hydrolysis activity, exotherm-generation activity or TWC activity.

A further catalytically active composition 55 having the same type of activity as the plurality of particles 45 is applied as a washcoat on the walls 40 of a second region 60 of the catalyst article 5. The second region 60 of the catalyst article 5 extends from the downstream end 30. Although the second region 60 is shown as not overlapping the first region 50, the second region 60 may be arranged to overlap the first region. The first region 50 is shown as being shorter in length than the second region 60. The first region 50 may be of the same length as the second region 60. The first region 50 may be longer than the second region 60.

The exhaust gas treatment system 1 further comprises an induction coil 70 surrounding at least the first region of the catalyst article 5. The induction coil 70 is electrically connected to a power source (not shown) capable of providing alternating electric current to the induction coil 70.

In use, during cold-start, an alternating electric current is applied to the induction coil 70 by the power source thereby generating an alternating magnetic field in the first region of the catalyst article 5. The alternating magnetic field inductively heats the plurality of catalytically-active transition-metal-doped iron oxide magnetic particles 45. This heating enables the plurality of catalytically-active transition-metal-doped iron oxide magnetic particles 45 to reach their operating temperature during cold-start. The term "operating temperature" refers to the temperature at which the particles are conducive to catalytic activity.

A cold exhaust gas from a combustion engine 10 passes out of the engine 10 to the catalyst article 5. The exhaust gas then contacts the inductively heated plurality of particles 45 provided on the first region 50 of the catalyst article 5. The plurality of particles 45 are able to treat the cold exhaust gas received from the engine, since the plurality of particles 45 have been inductively heated to their operating temperature.

The hot exhaust gas then contacts the further catalytically active composition 55 provided on the second region 60 of the catalyst article 5. The further catalytically active composition 55 is not inductively heated by the electromagnetic field. However, the further composition may be heated by conduction of heat from the plurality of particles 45 to the further catalytically active composition 55 and by the hot exhaust gas. Accordingly, the plurality of particles 45 may accelerate the heating of the further catalytically active composition to reach its operating temperature such that the further catalytically active composition 55 can treat exhaust gas more quickly following cold-start of an engine.

The exhaust gas then leaves the catalyst article 5 and enters the remainder 15 of the exhaust gas treatment system 1 for optional further treatment therein.

Figure 2:
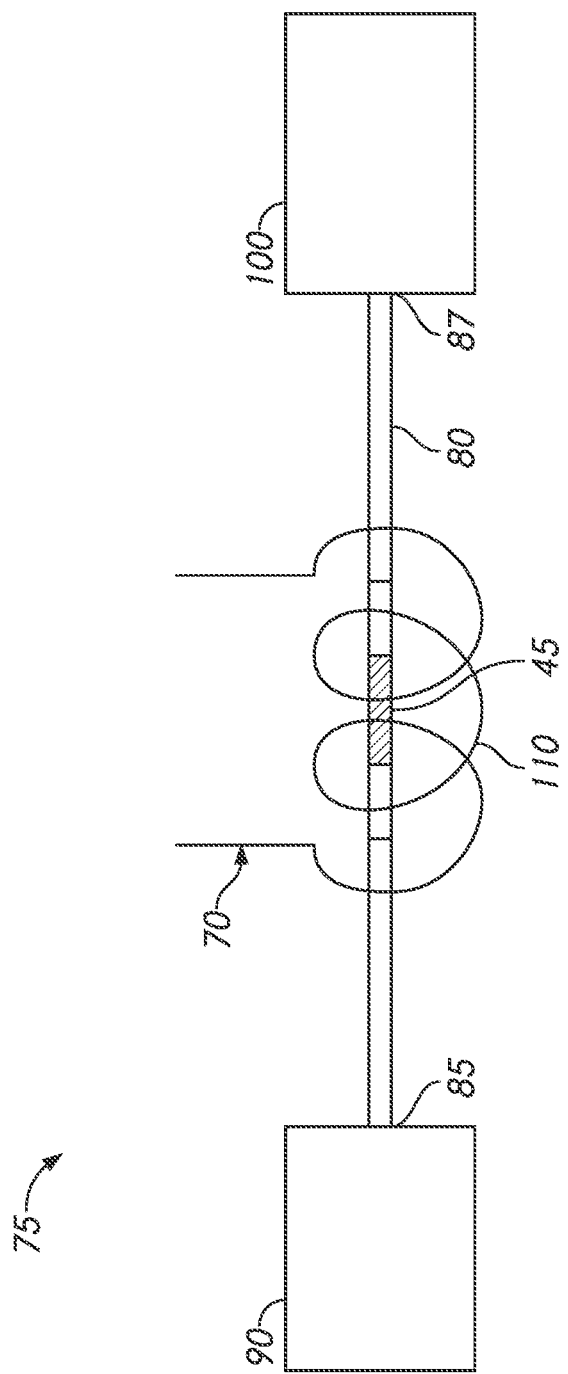
FIG. 2 shows the apparatus employed to test the performance of the catalyst article of FIG. 1.

The performance of the catalytically-active transition-metal-doped iron oxide magnetic particles 45 was tested using the apparatus 75 shown in FIG. 2. The results of the tests are discussed below. The apparatus 75 comprises a sealed enclosure (not shown) having a tube 80 formed of quartz therein. The tube 80 has an inlet 85 and an outlet 87. The inlet 85 of the tube 80 is in gaseous communication with an exhaust gas supply 90 located upstream of the tube 80 and externally to the sealed enclosure. The outlet 87 of the tube 80 is in gaseous communication with a Fourier-transform infrared (FTIR) spectroscope 100 located downstream of the tube and externally to the sealed enclosure. The tube 80 contains the plurality of the catalytically-active transition-metal-doped iron oxide magnetic particles 45 therein and quartz wool 110 configured to immobilize the plurality of particles 45. The apparatus comprises an induction coil 70 surrounding at least the portion of the tube 80 containing the plurality of particles 45. A power source (not shown) is electrically connected to the induction coil 70. The power source is capable of providing alternating electric current to the induction coil 70. The induction coil 70 is water cooled such that its temperature does not affect the measurement of temperature of the plurality of particles 45 within the tube 80, which is discussed below.

Figure 3:
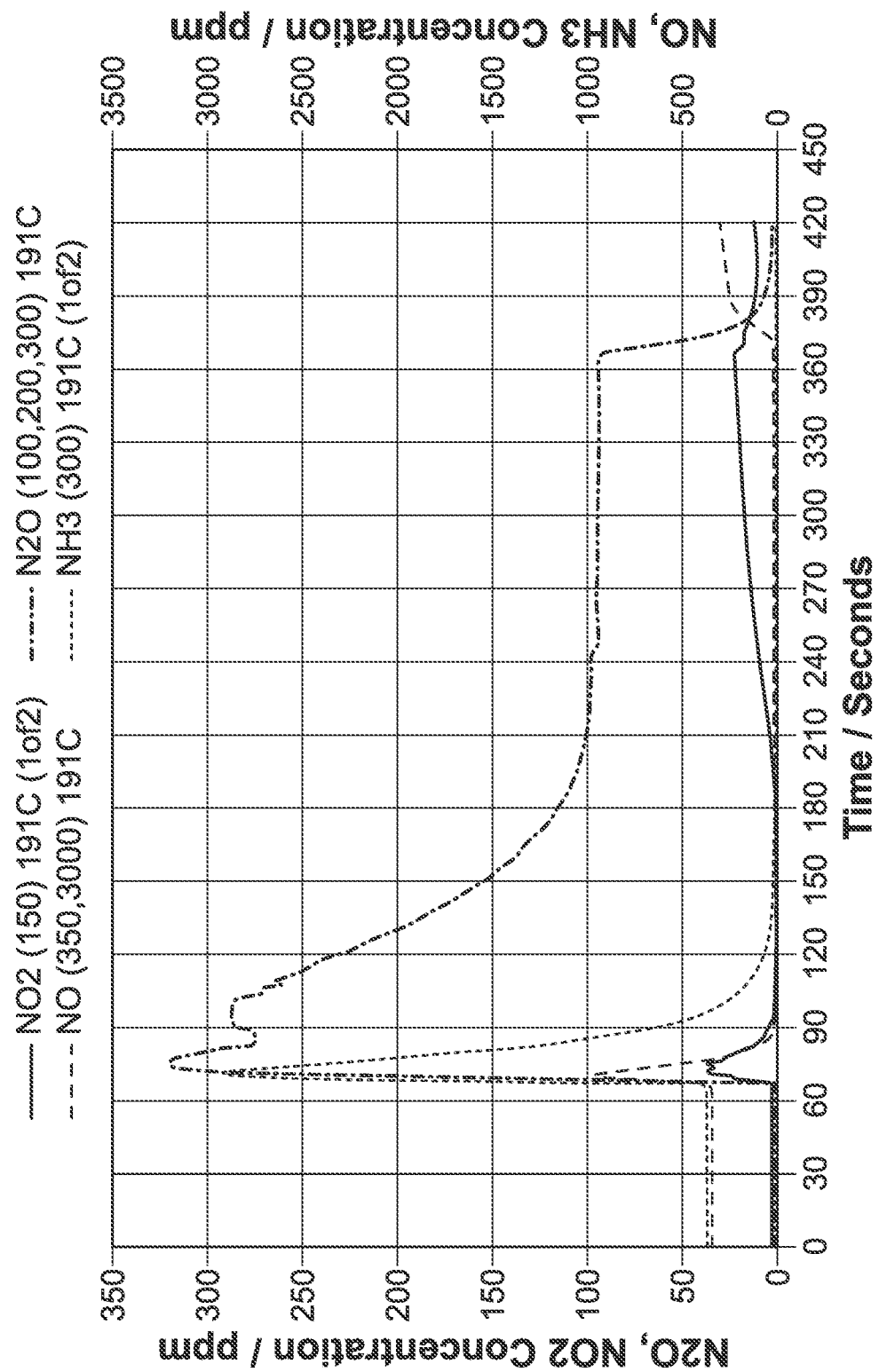
FIG. 3 shows a plot of concentration of $NO_2$, $N_2O$, NO and $NH_3$ in ppm against time in seconds over the course of Experiment 1.

FIG. 3 shows a plot of concentration of $NO_2$, $N_2O$, NO and $NH_3$ in ppm against time in seconds over the course of Experiment 1. Concentration of $N_2O$ and $NO_2$ in ppm is provided on the left-hand y-axis. Concentration of NO and $NH_3$ in ppm is provided on the right-hand y-axis. Time in seconds is provided on the x axis. At time period 65-75 seconds, the relative peak heights of the lines shown in FIG. 3 are such that the highest peak is for $N_2O$ concentration, the second highest peak is for $NH_3$ concentration, the third highest peak is for NO concentration and the lowest peak is for $NO_2$ concentration.

Figure 4:
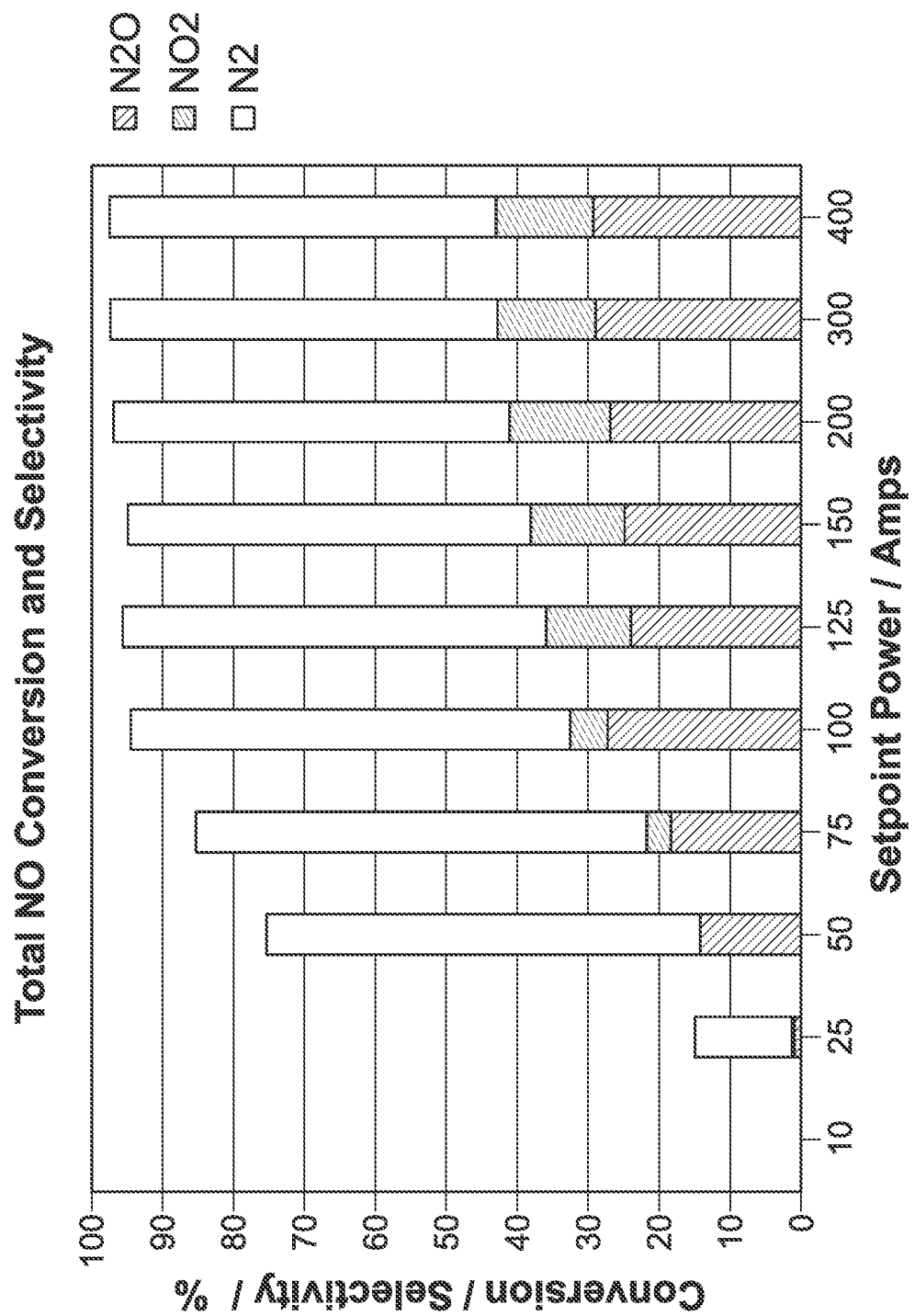
FIG. 4 shows a bar chart of power supplied to the induction coil 70 against conversion of NO into $NO_2$, $N_2$ and $N_2O$ over the course of Experiment 1.

FIG. 4 shows a bar chart of power supplied to the induction coil 70 against conversion of NO into $NO_2$, $N_2$ and $N_2O$ over the course of Experiment 1. Percentage of $NO_2$, $N_2O$ and $N_2$ is provided on the y-axis. Power in Amps is provided on the x-axis. The top part of each bar represents percentage of $N_2$. The bottom part of each bar represents percentage of $N_2O$. The middle part of each bar represents percentage of $NO_2$.

Figure 5:
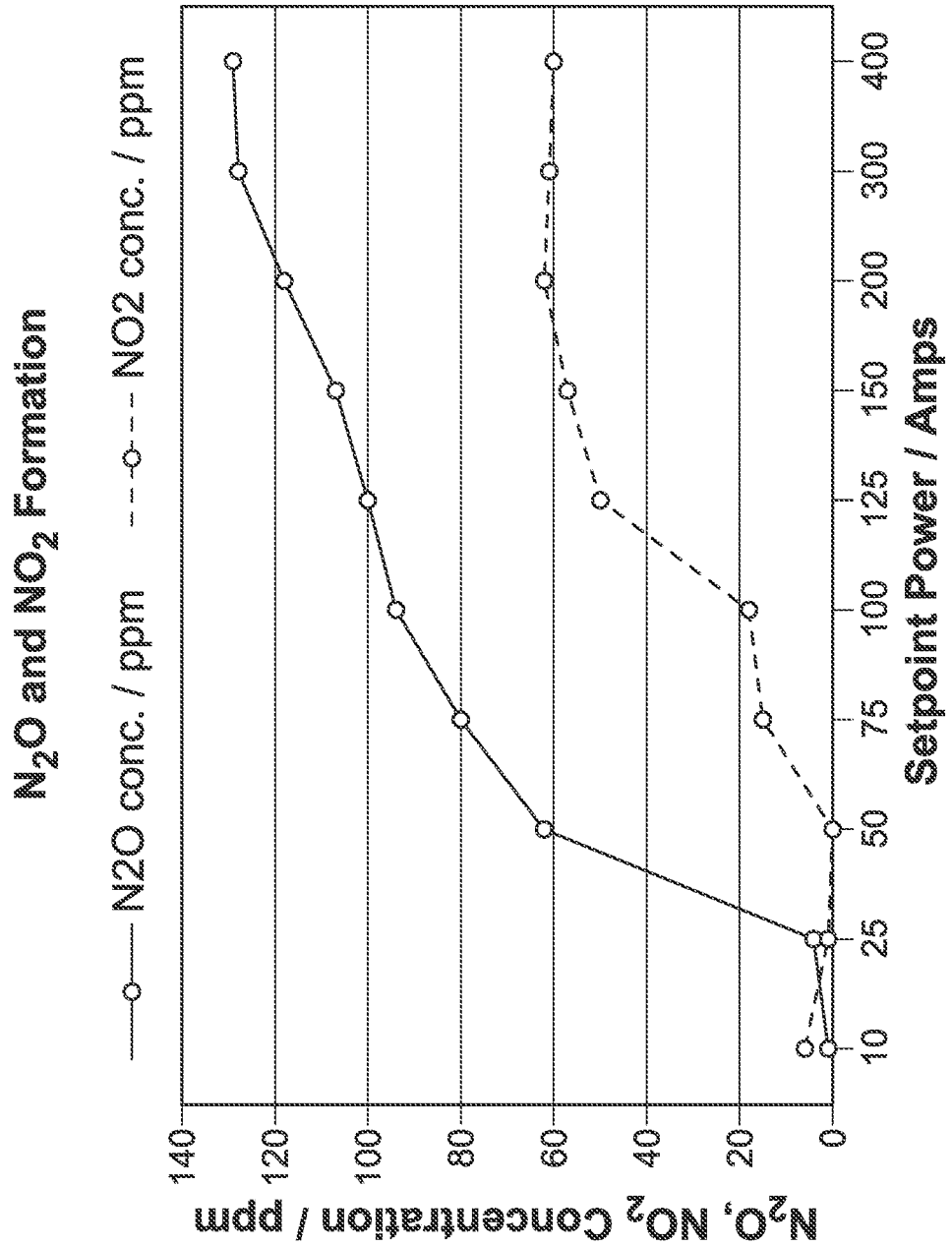
FIG. 5 shows a plot of concentration of $N_2O$ and $NO_2$ in ppm against power in Amps over the course of Experiment 1.

FIG. 5 shows a plot of concentration of $N_2O$ and $NO_2$ in ppm against power in Amps over the course of Experiment 1. Concentration of $N_2O$ and $NO_2$ in ppm is provided on the y-axis. Power in Amps is provided on the x-axis. The lower of the two lines at 400 Amps represents concentration of $NO_2$, the other line represents concentration of $N_2O$.

Figure 6:
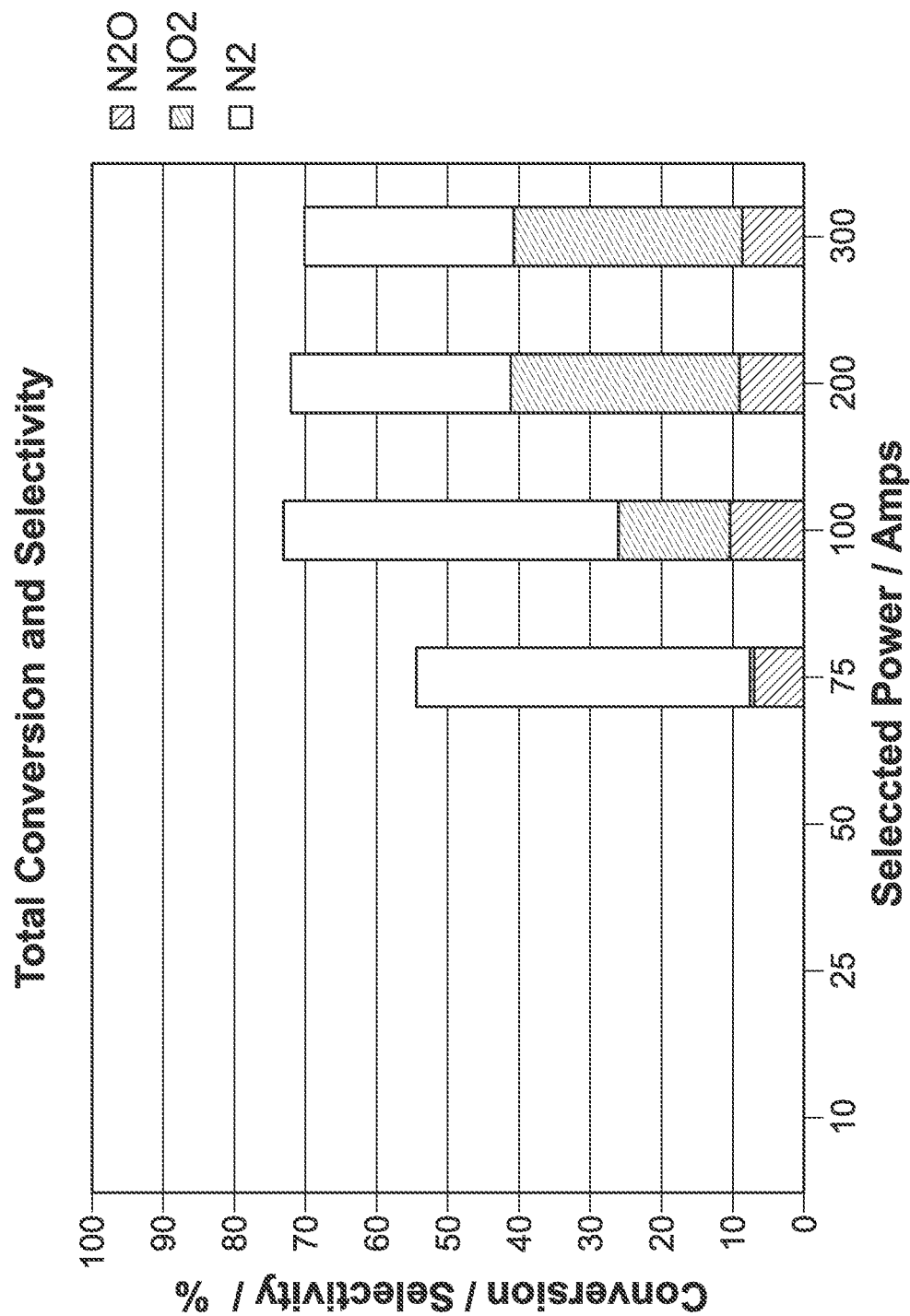
FIG. 6 shows a bar chart of power supplied to the induction coil 70 against conversion of NO into $NO_2$, $N_2$ and $N_2O$ over the course of Experiment 2.

FIG. 6 shows a bar chart of power supplied to the induction coil 70 against conversion of NO into $NO_2$, $N_2$ and $N_2O$ over the course of Experiment 2. Percentage of $NO_2$, $N_2O$ and $N_2$ is provided on the y-axis. Power in Amps is provided on the x-axis. The top part of each bar represents percentage of $N_2$. The bottom part of each bar represents percentage of $N_2O$. The middle part of each bar represents percentage of $NO_2$.

Figure 7:
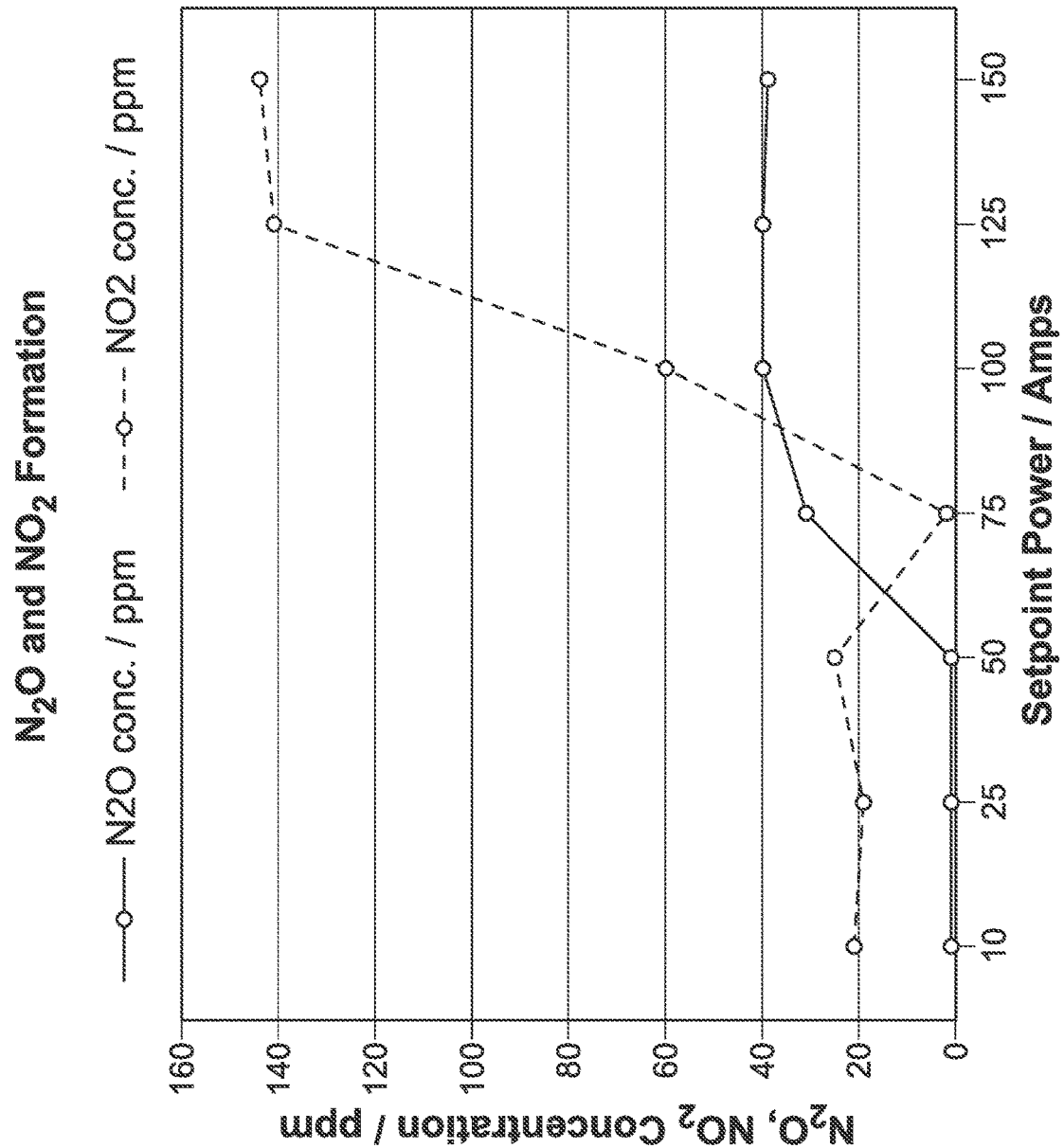
FIG. 7 shows a plot of concentration of $N_2O$ and $NO_2$ in ppm against power in Amps over the course of Experiment 2.

FIG. 7 shows a plot of concentration of $N_2O$ and $NO_2$ in ppm against power in Amps over the course of Experiment 2. Concentration of $N_2O$ and $NO_2$ in ppm is provided on the y-axis. Power in Amps is provided on the x-axis. The lower of the two lines at 150 Amps represents concentration of $N_2O$, the other line represents concentration of $NO_2$.

EXAMPLES

The invention will now be described in relation to the following non-limiting examples.

Two types of catalytically-active transition-metal-doped iron oxide magnetic particles were tested for their performance in treating an exhaust gas from an internal combustion engine using the apparatus of FIG. 2, which is discussed above. Experiment 1 was performed with catalytically-active transition-metal-doped iron oxide magnetic particles formed of $MnFe_2O_4$. Experiment 2 was performed with catalytically-active transition-metal-doped iron oxide magnetic particles formed of $CUFe_2O_4$. The methodology for each experiment is provided below.

Experimental Method

In each experiment, the plurality of particles 45 were placing inside the tube 80 and immobilized with quartz wool 110. An exhaust gas at room temperature (approximately 25°

C.) from the exhaust gas supply 90 flowed into the tube 80 via the inlet 85, contacted the plurality of particles 45 and flowed out of the tube 80 via the outlet 87 to the MKS MultiGas™ 2030 FTIR spectroscope 100 for analysis. The simulated partial diesel exhaust gas supply 90 was from a Hiden Analytical Catlab instrument comprising 400 ppm of NO, 400 ppm of $NH_3$, 5% $CO_2$, 10% $O_2$ and the balance $N_2$. The gas flow through the tube 80 during each experiment was at a rate of approximately 1 L/min. The alternating electric current was supplied by an Ambrell EasyHeat® 0224 instrument fitted with a 1.5" length×1.5" diameter multi-turn helical coil.

Once the gas flow through the tube 80 had stabilised, the power supply was turned on such that the alternating electric current was applied to the induction coil 70 by the power source. The alternating electric current generated an alternating magnetic field in the region of the tube 80 having the plurality of particles 45 therein. The alternating electric current was applied to the induction coil 70 for five minutes. The alternating magnetic field inductively heated the plurality of particles 45 within the tube 80. This heating enabled the plurality of particles 45 to reach their operating temperature.

The exhaust gas flowing through the tube 80 contacted the inductively heated plurality of particles 45. The exhaust gas then left the tube 80 via the outlet 87 and entered the FTIR spectroscope 100 for analysis. The spectra obtained by the FTIR spectroscope 100 were used to determine the concentration of the components of the exhaust gas over the course of the experiments.

Experiment 1

As discussed above, Experiment 1 was performed using the above methodology with the plurality of particles within the tube 80 being formed of $MnFe_2O_4$. The exhaust gas flow through the tube 80 commenced at time 0 seconds, the supply of alternating electric current to the induction coil 70 started at time 65 seconds and the supply of alternating electric current to the induction coil 70 stopped at time 365 seconds.

To measure the temperature of the particles of $MnFe_2O_4$ over the course of the experiment, the sealed enclosure was opened and an IR thermal imaging camera was placed inside the sealed enclosure after the alternating electric current had been applied to the inductive coil for 120 seconds (i.e. at time 185 seconds). The measured temperature of the $MnFe_2O_4$ particles was 200° C. thereby confirming that the $MnFe_2O_4$ particles are inductively heatable. It is noted that the temperature of the $MnFe_2O_4$ particles at time 185 seconds may be greater than 200° C., since some heat loss may have occurred on opening the enclosure to insert the thermal imaging camera. Nevertheless, this temperature measurement shows that the $MnFe_2O_4$ particles are inductively heatable.

FIG. 3 comprises data obtained by the FTIR 100 over the course of the experiment performed with the plurality of particles 45 within the tube 80 being formed of $MnFe_2O_4$, herein referred to as $MnFe_2O_4$ particles, and the power supplied to the induction coil 70 being between 0-400 Amps (0-2400 Watts). FIG. 3 is a graph of concentration of $NO_2$, $N_2O$, NO and $NH_3$ in ppm against time in seconds over the course of the experiment.

As can be seen from FIG. 3, on commencing the induction heating at time 65 seconds, there is a spike in concentration of NO and $NH_3$. One explanation for this observation is that on commencing flow of exhaust gas through the tube 80 before inductively heating the plurality of particles, NO and $NH_3$ adsorbs onto the surface of the plurality of particles 45. It is considered that the spike at time 65 seconds is a consequence of desorption of NO and $NH_3$ from the surface of the particles 45 on commencing the inductive heating. An alternative explanation is that on commencing flow of exhaust gas through the tube 80 before inductively heating the plurality of particles 45, ammonium nitride and ammonium nitrate form and adsorb onto the surface of the plurality of particles 45. On commencing the inductive heating, the decomposition of ammonium nitride and ammonium nitrate lead to $N_2O$ formation. A method of determining which of these explanations is more plausible would be to characterise the plurality of particles 45 after exposure to the exhaust gas in the absence of induction heating, using an appropriate analytical technique. A method to avoid the adsorption of NO or $NH_3$ or the formation and adsorption of ammonium nitride or ammonium nitrate on the plurality of particles 45 would be to introduce a bypass gas flow to the experimental apparatus. The bypass gas flow would independently allow the plurality of particles 45 to be inductively heated and the exhaust gas supply to stabilise, before the exhaust gas supply contacts the plurality of particles 45.

This spike in FIG. 3 would not be expected to be seen in an engine, since there would be no pre-exposure to the NO and $NH_3$ before heating. At time 95 seconds, the concentrations of NO and $NH_3$ decreased to 0 ppm. Accordingly, over the course of 30 seconds, for which the $MnFe_2O_4$ particles were inductively heated, 100% conversion of NO and $NH_3$ has been performed by the plurality of particles 45. It is noted that the time period of 30 seconds also includes the time during which desorption of NO and $NH_3$ occurs. Without such desorption, the time taken for full 100% conversion of NO and $NH_3$ might be approximately 20 seconds. The induction heating was switched off at time 365 seconds after which the concentration of NO increased due to lack of conversion by the $MnFe_2O_4$ particles. The $NO_2$ formation and $N_2O$ formation accordingly also decreased at this point in time.

In summary, FIG. 3 together with the temperature measurement at time 185 seconds shows the particles of $MnFe_2O_4$ are inductively heatable to reach their operating temperature and have SCR activity when inductively heated.

FIG. 4 is a graph of power supplied to the induction coil 70 against conversion of NO into $NO_2$, $N_2$ and $N_2O$ over the course of the first experiment. From FIG. 4, it can be seen that the particles of $MnFe_2O_4$ have SCR catalytic activity once the power supplied to the induction coil 70 reaches 50 Amps. Accordingly, it can be seen that conversion of NO by the $MnFe_2O_4$ particles occurs once the $MnFe_2O_4$ particles have been sufficiently inductively heated to reach their operating temperature. The catalytic activity of the $MnFe_2O_4$ particles increases with increased supply of power to the induction coil 70. Accordingly, the catalytic activity of the $MnFe_2O_4$ particles increases as the temperature of the $MnFe_2O_4$ particles increases. The conversion of NO into $NO_2$, $N_2$ and $N_2O$ reaches 95% and stabilises at that value once the power supply reaches 100 Amps.

In summary, FIG. 4 shows that the particles of $MnFe_2O_4$ have SCR catalytic activity once inductively heated. The catalytic activity of the $MnFe_2O_4$ particles is maximised once the power supplied to the induction coil 70 reaches 100 Amps.

The $N_2O$ and $NO_2$ formation data of FIG. 4 is presented as a line graph in FIG. 5. From both FIG. 4 and FIG. 5, it can be seen that selectivity of the reactions of the exhaust gas changes with increasing power supplied to the induction coil 70 (and so increased temperature of the inductively heated $MnFe_2O_4$ particles). $NO_2$ formation starts when the power supply reaches 75 Amps. A sharp increase in formation of $NO_2$ occurs when the power supplied to the induction coil 70 is increased from 100 to 125 Amps. It is considered that on increasing the power supplied to the induction coil 70 there is an increase in temperature achieved by the plurality of particles 45, which leads to increased catalytic activity. The formation of $NO_2$ is maximised and stabilised once the power supplied to the induction coil 70 reaches 150 Amps. The formation of $N_2O$ starts when the power supplied to the induction coil 70 reaches 50 Amps and stabilises when the power supply reaches approximately 300 Amps. Accordingly, the selectivity of the reactions of the exhaust gas depends upon the temperature of the $MnFe_2O_4$ particles.

Experiment 2

As discussed above, Experiment 2 was performed using the same methodology as Experiment 1 except that the plurality of particles 45 within the tube 80 were formed of $CuFe_2O_4$, herein referred to as $CuFe_2O_4$ particles.

FIG. 6 is a graph of power supplied to the induction coil 70 against conversion of NO into $NO_2$, $N_2$ and $N_2O$ over the course of the second experiment. From FIG. 6, it can be seen that the particles of $CuFe_2O_4$ have SCR catalytic activity once the power supplied to the induction coil 70 reaches 75 Amps. Therefore, FIG. 6 demonstrates that conversion of NO by the $CuFe_2O_4$ particles occurs once the $CuFe_2O_4$ particles have been sufficiently inductively heated to reach their operating temperature. The conversion of NO into $NO_2$, $N_2$ and $N_2O$ reaches a maximum value of 72% and stabilises at that value once the power supply reaches 100 Amps. In summary, FIG. 6 demonstrates that the particles of $CuFe_2O_4$ have catalytic activity once inductively heated by supplying at least 75 Amps of power to the induction coil 70. It is noted that the $CuFe_2O_4$ particles have reduced activity compared to the $MnFe_2O_4$ particles. Nonetheless, activity was demonstrated.

The $N_2O$ and $NO_2$ formation data of FIG. 6 is presented as a line graph in FIG. 7. As shown in FIGS. 6 and 7, selectivity of the reactions of the exhaust gas changes with increasing power supplied to the induction coil 70. The proportion of $NO_2$ formed significantly increases as the power supplied to the induction coil 70 is increased from 75 Amps. The proportion of $NO_2$ formed stabilises when the power supplied to the induction coil 70 reaches 125 Amps. Therefore, the greater the temperature of the $CuFe_2O_4$ particles, the greater proportion of $NO_2$ is formed. The formation of $N_2O$ starts when the power supplied to the induction coil reaches 75 Amps. The formation of $N_2O$ remains stable as the power supplied to the induction coil increases beyond 75 Amps.

Although preferred embodiments of the invention have been described herein in detail, it will be understood by those skilled in the art that variations may be made thereto without departing from the scope of the invention or of the appended claims.

For the avoidance of any doubt, the entire content of any and all documents cited herein is incorporated by reference into the present application.

The invention claimed is:

1. An exhaust gas treatment system comprising a catalyst article for the treatment of an exhaust gas, the catalyst article comprising a non-metallic substrate comprising a plurality of catalytically-active transition-metal-doped iron oxide magnetic particles, and an inductive heater for inductively heating the plurality of catalytically-active magnetic particles by applying an alternating magnetic field.

2. The exhaust gas treatment system of claim 1, wherein the non-metallic substrate is a ceramic substrate.

3. The exhaust gas treatment system of claim 1, wherein the plurality of catalytically-active magnetic particles are ferromagnetic or superparamagnetic.

4. The exhaust gas treatment system of claim 1, wherein the plurality of magnetic particles have a mean particle size of from 1 nm to 10 µm.

5. The exhaust gas treatment system of claim 1, wherein the plurality of magnetic particles consist of transition-metal-doped iron oxide magnetic particles.

6. The exhaust gas treatment system of claim 1, wherein the plurality of catalytically-active magnetic particles are surface-coated with a further catalytic material.

7. The exhaust gas treatment system of claim 1, wherein the plurality of catalytically-active magnetic particles have a spinel-type microstructure.

8. The exhaust gas treatment system of claim 1, wherein the magnetic particles comprise $Mn_xFe_{3-x}O_4$, $Co_xFe_{3-x}O_4$, $Cu_xFe_{3-x}O_4$ or a mixture of two or more thereof, wherein $x>0$ and $x\leq 1$.

9. The exhaust gas treatment system of claim 1, wherein the magnetic particles are provided only on a region extending from one end of the catalyst article.

10. The exhaust gas treatment system of claim 1 wherein the plurality of catalytically-active magnetic particles have SCR activity, ASC activity, DOC activity, Urea-hydrolysis activity, Exotherm-generation activity or TWC activity.

11. The exhaust gas treatment system of claim 1, wherein the plurality of catalytically-active magnetic particles are provided as a washcoat on the non-metallic substrate.

12. The exhaust gas treatment system of claim 1, wherein the alternating magnetic field has a frequency from 100 kHz to 1 Mhz.

13. An internal combustion engine comprising the exhaust gas treatment system according to claim 1.

14. A method for the treatment of an exhaust gas, the method comprising
   contacting an exhaust gas with the exhaust gas treatment system according to claim 1 and
   inductively heating the plurality of catalytically-active magnetic particles with an alternating magnetic field produced by the inductive heater for inductively heating the plurality of catalytically-active magnetic particles.

15. The exhaust gas treatment system of claim 1, wherein the plurality of magnetic particles have a mean particle size of from 10 to 500 nm.

16. The exhaust gas treatment system of claim 6, wherein the further catalytic material comprises one or more platinum group metals.

* * * * *